United States Patent
Buban et al.

(10) Patent No.: US 12,094,231 B1
(45) Date of Patent: Sep. 17, 2024

(54) COMPUTER VISION BASED DOCUMENT PARSING

(71) Applicant: States Title, LLC, San Francisco, CA (US)

(72) Inventors: James P. Buban, Knoxville, TN (US); Allen Ko, Oakland, CA (US)

(73) Assignee: States Title, LLC, San Francisco, CA (US)

( * ) Notice: Subject to any disclaimer, the term of this patent is extended or adjusted under 35 U.S.C. 154(b) by 376 days.

(21) Appl. No.: 17/492,509

(22) Filed: Oct. 1, 2021

(51) Int. Cl.
| | |
|---|---|
| *G06V 30/413* | (2022.01) |
| *G06F 18/214* | (2023.01) |
| *G06N 3/04* | (2023.01) |
| *G06V 10/82* | (2022.01) |
| *G06V 30/12* | (2022.01) |
| *G06V 30/412* | (2022.01) |
| *G06V 30/414* | (2022.01) |

(52) U.S. Cl.
CPC .......... *G06V 30/413* (2022.01); *G06F 18/214* (2023.01); *G06N 3/04* (2013.01); *G06V 10/82* (2022.01); *G06V 30/12* (2022.01); *G06V 30/412* (2022.01); *G06V 30/414* (2022.01)

(58) Field of Classification Search
CPC .... G06V 30/12; G06V 30/412; G06V 30/413; G06V 30/414; G06V 10/82; G06F 18/214; G06N 3/04
See application file for complete search history.

(56) References Cited

U.S. PATENT DOCUMENTS

| | | | |
|---|---|---|---|
| 5,361,201 A | 11/1994 | Jost et al. | |
| 10,402,640 B1 | 9/2019 | Becker et al. | |
| 11,367,297 B2 | 6/2022 | Bildner et al. | |
| 11,715,310 B1 | 8/2023 | Sammons et al. | |
| 2011/0222771 A1* | 9/2011 | Cimpoi ............... | G06V 30/224 382/176 |
| 2019/0019020 A1 | 1/2019 | Flament et al. | |
| 2019/0026577 A1* | 1/2019 | Hall ..................... | G06V 30/413 |
| 2019/0180115 A1 | 6/2019 | Zou | |
| 2020/0160050 A1 | 5/2020 | Bhotika et al. | |
| 2020/0372623 A1 | 11/2020 | Lawlor et al. | |
| 2020/0394567 A1 | 12/2020 | Choe et al. | |
| 2021/0019512 A1* | 1/2021 | Uppal .................. | G06V 10/454 |

* cited by examiner

*Primary Examiner* — Daniel G Mariam
(74) *Attorney, Agent, or Firm* — Fish & Richardson P.C.

(57) ABSTRACT

Methods, systems, and apparatus, including computer programs encoded on computer storage media, for machine learning. One of the methods includes receiving one or more page images from a document; for each page image: providing the page image to a computer vision neural network model, wherein the neural network model is trained for the particular page type and is configured to output predictions of coordinates for one or more regions within the image and corresponding labels for the respective regions; and generating an output data structure associating each labeled region with text content located within the labeled region.

21 Claims, 7 Drawing Sheets

600

Closing Disclosure

This form is a statement of final loan terms and closing costs. Compare this document with your Loan Estimate.

| Closing Information | | Transaction Information | | Loan Information | |
|---|---|---|---|---|---|
| Date Issued | 4/15/2013 | Borrower | Michael Jones and Mary Stone 123 Anywhere Street Anytown, ST 12345 | Loan Term | 30 years |
| Closing Data | 4/15/2013 | | | Purpose | Refinance |
| Disbursement Data | 4/15/2013 | | | Production | Fixed Rate |
| Settlement Agent | Zeta Title | Lender | Ficus Bank | Loan Type | ☒ Conventional ☐ FHA ☐ VA |
| File # | 12-3456 | | | Loan ID# | 123456789 |
| Property | 123 Anywhere Street Anytown, ST 12345 | | | MIC# | 009874513 |
| Appraised Prop. Value | $180,000 | | | | |

602

| Loan Terms | | 604 | Can this amount increase after closing? |
|---|---|---|---|
| Loan Amount | $150,000 | | NO |
| Interest Rate | 4.25% | | NO |
| Monthly Principal & Interest See Projected Payments below for your Estimated Total Monthly Payment | $737.91 | | NO |
| | | 606 | Does the loan have these features? |
| Prepayment Penalty | | | NO |
| Balloon Payment | | | NO |

| Projected Payments | | | |
|---|---|---|---|
| Payment Calculation | | Years 1-4 | Years 5-30 |
| Principal & Interest | | $737.91 | $737.91 |
| Mortgage Insurance | + | 82.35 | + — |
| Estimated Escrow Amount can increase over time | + | 206.13 | + 206.13 |
| Estimated Total Monthly Payment | | $1,026.39 | $944.04 |

| Estimated Taxes, Insurance & Assessments Amount can increase over time See details on page 4 | $356.13 a month | This estimate includes ☒ Property Taxes ☒ Homeowner's Insurance ☒ Other: HOA Dues | In escrow? YES YES NO |
|---|---|---|---|

608

See page 4 for escrowed property costs. You must pay for other property costs separately.

*FIG. 6*

| Costs at Closing | | |
|---|---|---|
| Closing Costs | $5,757.57 | Includes $3,495.50 in Loan Costs+$2,762.07 in Other Costs-$500 in Lender Credits. See page 2 for details. |
| Cash to Close | $29,677.43 | Includes Closing Costs. See Calculating Cash to Close on page 3 for details.<br>☐ From ☒ To Borrower |

CLOSING DISCLOSURE                                PAGE 1 OF 5 - LOAN ID # 123456789

| Calculating Cash to Close | | Use this table to see what has changed from your Loan Estimate. | |
|---|---|---|---|
| | Loan Estimate | Final | Did this change? |
| Loan Amount | $150,000.00 | $150,000.00 | NO |
| Total Closing Costs (J)  702 | -$5,099.00 | -$5,757.57 | YES • See Total Loan Costs (D) and Total Other Costs (I) |
| Closing Costs Paid Before Closing | $0 | $435.00 | YES • You paid these Closing Costs before closing |
| Total Payoffs and Payments (K) | -$120,000.00 | -$115,000.00 | YES • See payoffs and payments (K) |
| Cash to Close | $24,901.00<br>☐From ☒To Borrower | $29,677.43<br>☐From ☒To Borrower | 706<br>Closing Costs Financed (Paid from your Loan Amount) $5,322.57 |

COMPUTER VISION BASED DOCUMENT PARSING

BACKGROUND

This specification relates to machine learning. Conventional machine learning models can be trained to generate a particular type of output from a given input. Typically, a machine learning model is trained using a collection of labeled training data. The machine learning model can be trained such that the model correctly labels the input training data. New data can then be input into the machine learning model to determine a corresponding label for the new data.

SUMMARY

Machine learning models can be used to identify data having a particular type. This specification describes a system that uses a neural network model, for example, a region-based convolutional neural network (RCNN), to process input images and to predict locations and types of data found within the input images. In some implementations, the predicted locations are coordinates defining bounding boxes at particular locations in the image. Each bounding box can be labeled by the neural network according to a set of available classifications. The output can be used to perform further processing on the images, for example, to extract text content from within the bounding boxes. This text can be analyzed to perform further operations, for example, to determine a semantic meaning of text portions and to match the meaning of the text portions with one or more corresponding system text descriptions.

The subject matter described in this specification can be implemented in particular embodiments so as to realize one or more of the following advantages. Using machine learning models, such as neural network models, eliminates the need for manual interpretation and input of data, which reduces the time needed to evaluate incoming data. Errors in transcription and in understating the data can be greatly reduced. In particular, using a neural network to perform computer vision can more accurately and quickly be used to process input images to identify the content of interest, which can then be processed without concern for other content of the image.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 6 is an example image showing identified regions of a document.

FIG. 7 is an example table including row and column bounding boxes.

Like reference numbers and designations in the various drawings indicate like elements.

DETAILED DESCRIPTION

Overview

Figure 1:
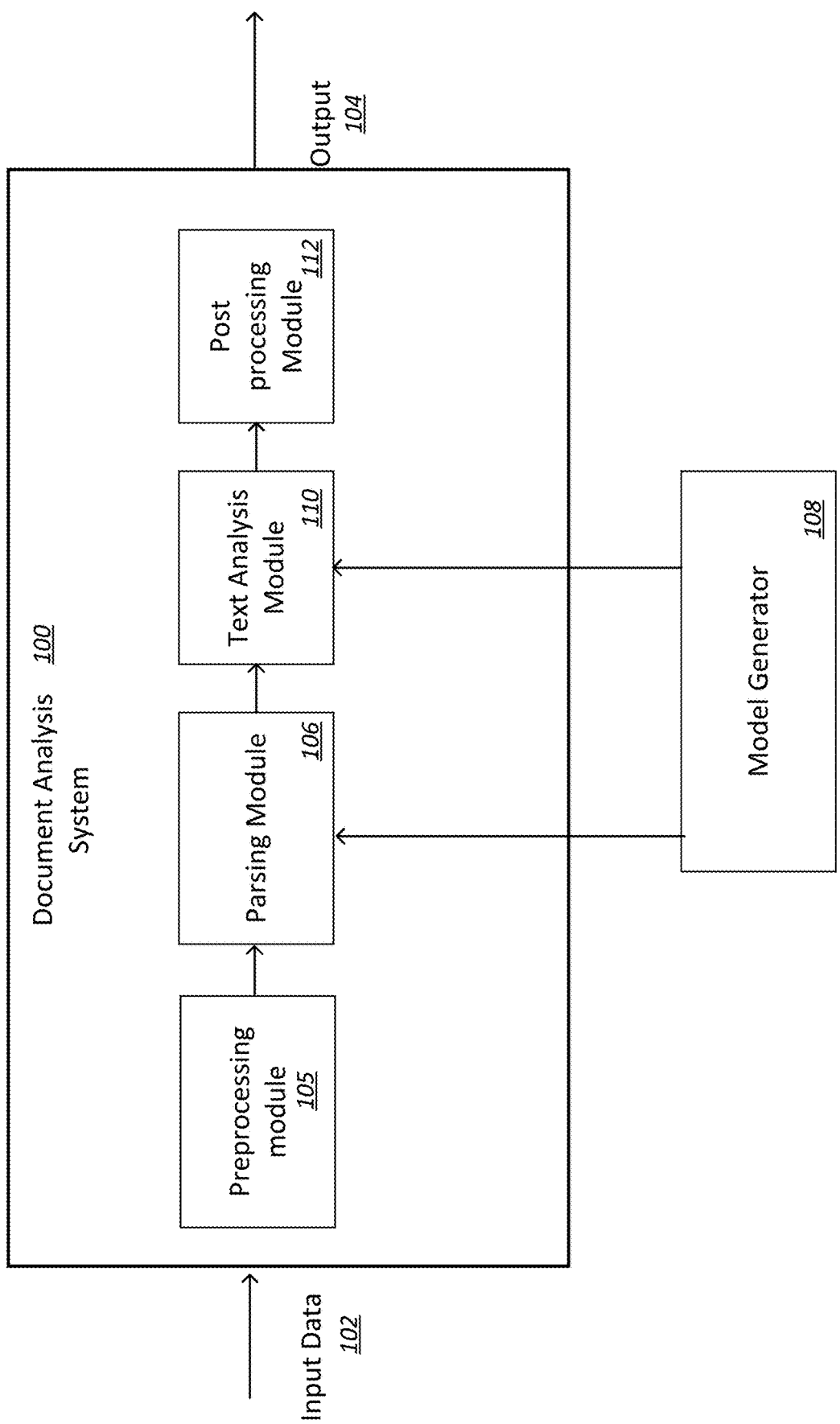
FIG. 1 is an example analysis system configured to perform computer vision based parsing.

Computer vision relates to how computers can be used to understand the content of digital images. For example, computer vision techniques seek to teach computers how to recognize particular objects in images, detect their locations or even completely segment an image by classifying each pixel as belonging to a predefined class. This specification describes a system that uses a several machine learning models, and in particular convolutional neural network models, to process input images and generate output data predicting the locations of the image in which data of a specified type is likely to be located. In some implementations, the machine learning model is a region-based convolutional neural network that performs a number of convolution operations on portions of an input image and uses the output of the convolutions to generate object predictions.

The predictions can then be used to further process the image content. For example, the image can contain textual data. The predicted locations can define bounding boxes surrounding particular text content. The regions defined by the bounding boxes can be further processed to extract and analyze the textual content contained within each bounding box. For example, in some cases text at a location corresponding to the bounding box, e.g., as encoded in image metadata, can be extracted. In another example, optical character recognition techniques can be used to convert the image data within the bounding box to readable text. Based on the assigned classification and/or the application of one or more natural language processing techniques, the text can be parsed to identify particular content. This content can further be used, for example, to compare the image content to other records, e.g., to perform validation or to identify inconsistencies.

In some implementations, the described machine learning models are part of a title production system for real property transactions. A title production system is used by title companies to manage workflows and work with various third parties involved in the transaction. During a typical real property transaction, there are a number of actions that need to take place, for example, to generate a title insurance policy for the real property transaction. To facilitate these actions there are a number of forms that need to be understood and checked for inconsistencies.

For example, one form is a closing disclosure form. A closing disclosure is a multipage form that includes a number of details associated with a mortgage loan that is part of the real estate transaction. For example, the closing disclosure includes loan terms, projected monthly payments, and fees associated with the mortgage. This is a fairly structured form with a number of different fields arranged in a particular layout.

During a typical real property transaction, there are a number of interactions between lenders and a title company. One example of these interactions is a fee collaboration process to identify and align all of the fees associated with the transaction, e.g., to be paid on or around the closing date of the transaction, to ensure that both parties agree. Both parties agree on the fees by exchanging documents back and forth and entering them into their respective systems.

Conventionally, the fee collaboration process entails the lender providing a title company with a closing disclosure document, which is typically a document within a larger closing package. The closing disclosure, amongst other things, lists out each fee associated with the transaction. Additionally, lender systems are typically not integrated with title company's systems. As a result, information cannot be directly exchanged between lenders and title companies. Instead, documents sent from the lender, e.g., as a portable document format (PDF) document, are manually processed by title company operators into the title production system, for example, by manually identifying portions of interest in the document and confirming or entering the information. This manual processing is slow and often introduces errors including incorrect fee identification and transcription errors. This can delay the transaction. Conventional text processing systems attempting to extract the text may also fail. For example, some text parsers rely on finding specific key words in the extracted text and using the presence of those key words to parse out particular information. However, parties do not generate consistent documents making simple rule based parsing difficult. For example, different parties who generate documents may use different terms or phrasing. A different rule may need to be generated for each variation, leading to the need for large numbers of rules that can still fail to correctly parse when further changes occur or documents are received from new entities.

Additionally, while the closing disclosure form is a standardized document, different lenders use different terminology to describe the various fees, which in turn may be different from the terminology used by the title production system of the title company. For example, a lender may reference a "notary fee" while the corresponding fee in the title production system is a "recording fee." Consequently, human agents have typically had to take the information from the received closing disclosure, determine the corresponding fee in the title production system, and input that into their title company's title production system using the corresponding terminology. This can be error prone both in terms of manual data entry errors as well as errors in assigning the correct fee based on the differing terminology.

This specification describes a system for using computer vision models to parse the page images of the closing disclosure or other structured documents to identify particular areas of interest and extracting the corresponding text. The extracted text can be used by the system for performing further analysis, for example, fee collaboration in which the fee information can be extracted from a closing disclosure and semantically understood so that they can be automatically matched to corresponding system descriptions and entered into the title production system.

System

FIG. 1 is an example analysis system 100. The system 100 can be (or be a subsystem of) a title production system. In particular, in some instances, the system 100 is an image analysis system that analyzes input data 102 to generate one or more outputs 104.

The image analysis system 100 includes a parsing module 106. The parsing module 106 extracts particular text components from the input data, e.g., an image or set of images. For example, the input image can be a document having one or more pages. In some instances, the document is a structured document having a particular layout corresponding to a form type. The image can include metadata encoding the text within the image. Alternatively, the parsing can include performing a character recognition process, e.g., OCR, to identify the text of the image.

The parsing module 106 can apply one or more machine learning models to identify particular locations within the image and the corresponding text for those regions. Parsing the image is described in greater detail below. The machine learning models can be generated using a model generator 108. The model generator 108 uses training data to train a model designed to generate a particular prediction based on input data. The module generator 108 can be part of, or separate from, the image analysis system 100. In particular, the machine learning models can be neural network models such as convolutional neural network models or region-based convolutional neural network models.

In some instances, the parsing module 106 is preceded by a preprocessing module 105 that separates out the input data composed of a number of images into individual images, e.g., pages of a document. Other adjustments such as aligning rotated images or image quality improvements for poorly scanned images can be applied. The preprocessing module 105 can determine a type associated with particular pages and pass pages of a particular type to the parsing module 106, e.g., the pages of a closing disclosure from among a larger closing package.

After parsing, the parsed text segments can pass to text analysis module 110. The text analysis module 110 can include various models used to perform particular text analysis. In some implementations, one or more models can be used to determine a semantic meaning of particular text and map that meaning, for example, to corresponding system defined text. For example, in a tittle production system, the models can be part of a fee collaboration step that determines the meaning of extracted fee descriptions and matches them to corresponding descriptions of the title production system. In some other implementations, the text analysis module includes one or more models to match the text to information of the system to confirm that the information in the text sections are correct. For example, the extracted text can be used to confirm vesting of a real estate transaction is correct.

The models applied in the analysis module can be machine learning models or can be rule based models. They can also be generated by the model generator 108.

The results of the text analysis module are input to a post processing module 112. The post processing module 112 can perform various actions depending on the type of processing being performed of the original image. For example, the post processing can be a verification that the extracted information is correct, both with respect to system data as well as consistent within the document. The post processing module 112 can provide an output 104 of a next step, e.g., a next action item in the title production system workflow. Similarly, if an error occurs either due to a discrepancy or unreadability of text, the output 104 can be a task to a human operator to manually evaluate the document.

Training a Neural Network

Figure 2:
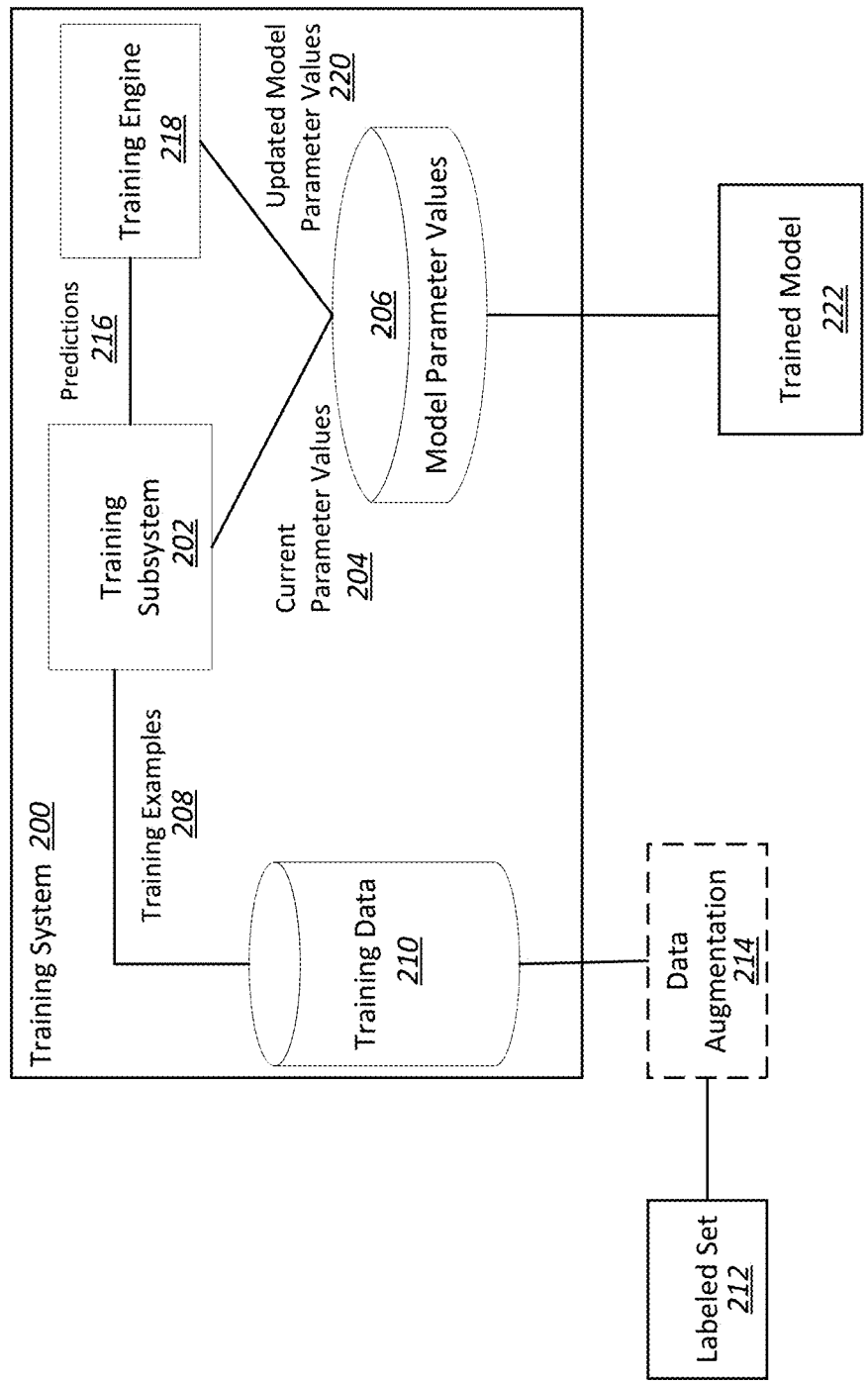
FIG. 2 is an example training system for a neural network.

FIG. 2 is an example training system 200 for a neural network. The training system 200 includes a training neural network subsystem 202 that can implement the operations of each layer of a neural network that is designed to make predictions, for example, of the locations within an image of particular fields of a document, from input data. The training neural network subsystem 202 includes a plurality of computing devices having software or hardware modules that implement the respective operations of each layer of the neural network according to an architecture of the neural network.

The training neural network subsystem 202 can compute the operations of each layer of the neural network using current parameter values 204 stored in a collection of model parameter values 206. Although illustrated as being logically separated, the model parameter values 206 and the software or hardware modules performing the operations may actually be located on the same computing device or on the same memory device.

The training neural network subsystem 202 can receive training examples 208 as input from training data 210. Each training example 208 can be an image labeled with particular bounding box coordinates corresponding to particular labeled fields of a form document represented by the image. For example, in some cases each training examples correspond to pages of a closing disclosure labeled with particular regions of interest. For example, a separate neural network model can be trained for each page of a closing disclosure using a collection of training examples for that page, e.g., from a collection of closing disclosures. The pages can be trained separately to generate separate models for each page.

The training data 210 includes a collection of images. Each image includes a set of coordinates defining respective bounding boxes and corresponding labels. The training data 210 can be composed of a human-labeled set 212 alone, or labeled images generated through data augmentation 214.

Human-labeled images each contain drawn bounding boxes and corresponding labels classifying the content of each bounding box. Each bounding box indicates a portion of a document represented by the image in which content corresponding to the label can be found.

Data augmentation allows for a smaller set of human-labeled documents to be used to generate a larger set of documents that introduces variance to the training set. For example, a particular human-labeled document can be augmented to adjust scaling, x or y axis translation, rotation, or change a contrast of text of the document to add variance. For example, an image can be augmented to simulate human induced variances in both form document generation as well as scanning or other techniques used to capture the image. The labeled bounding boxes are transformed according to the augmentation applied, e.g., if a document is scaled the bounding box coordinates of the augmented version of the document are adjusted accordingly. Similarly, if content of an image is translated along the x-axis by a particular amount, a corresponding translation can be applied to the baseline bounding box coordinates.

The training neural network subsystem 202 can generate, for each training example 208, one or more predictions 216 of bounding box locations and corresponding classification labels. A training engine 218 analyzes the object predictions 216 and compares the object predictions to the labels in the training examples 208. The training engine 218 then generates updated model parameter values 220 by using an appropriate updating technique. The training engine 216 can then update the collection of model parameter values 206 using the updated model parameter values 220.

After training is complete, the training system 200 can use a final set of model parameter values to form a trained neural network model 222. The trained neural network model can be used to make predictions based on incoming images.

In some implementations, the training data is based on a set of closing disclosure documents that have been human labeled or augmented to identify bounding boxes and labeled classifications for each bounding box. For example, each human labeled closing disclosure can have hard coded bounding boxed defined for each field in the form such as fields corresponding to a loan amount, closing costs, and each individual fee. The system is trained so that, for a given input page of the closing disclosure, predictions of bounding box locations and their classification can be output.

Convolutional Neural Networks

Figure 3:
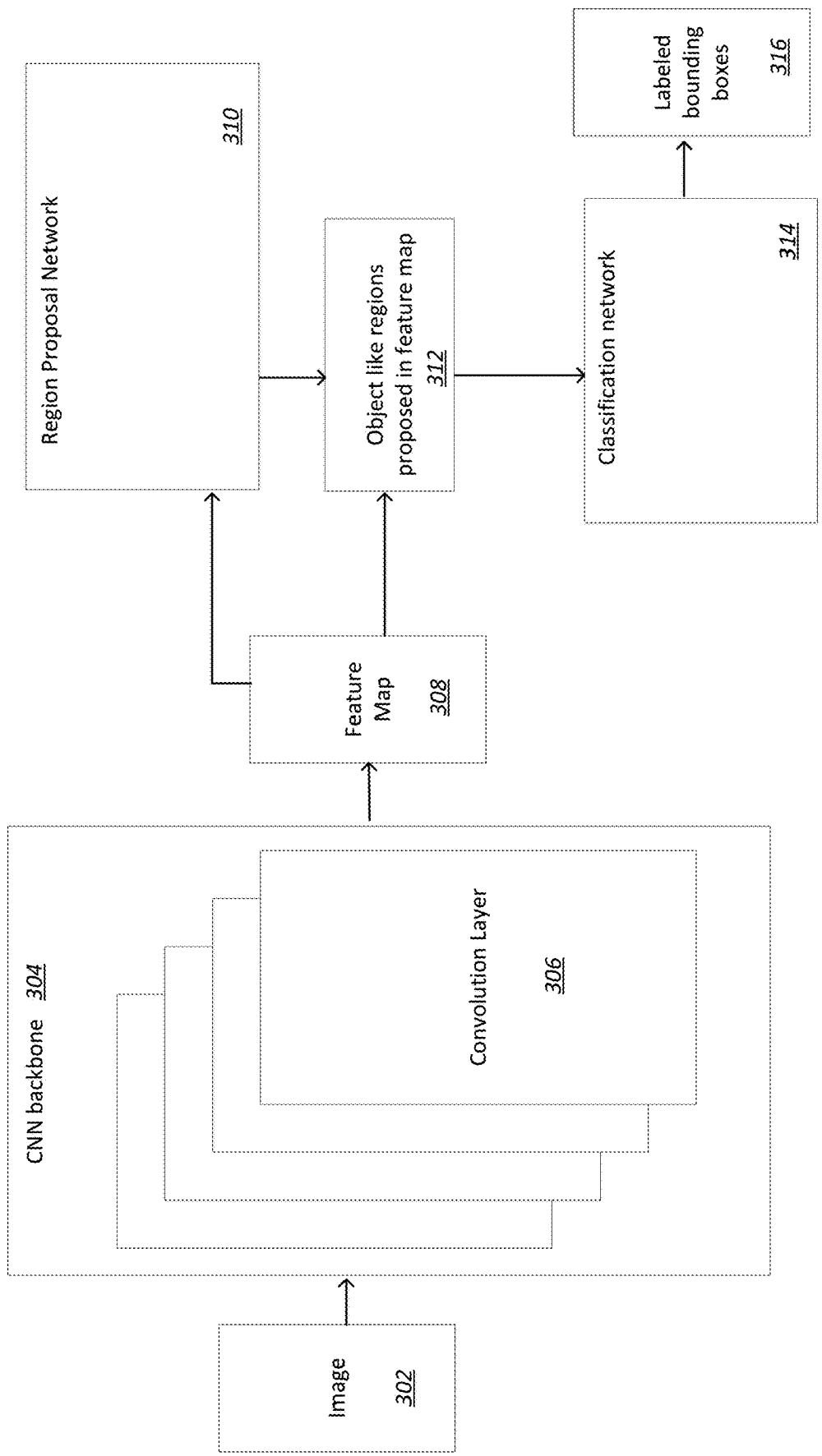
FIG. 3 is an example convolutional neural network.

FIG. 3 is an example region-based convolutional neural network 300. A convolutional neural network can generate one or more predictions for each input image. For example, the convolutional neural network can generate predictions of the locations of bounding boxes in the image corresponding to particular classification types of a set of classification types. The convolutional neural network can be trained, for example, as described above with respect to FIG. 2. A convolutional neural network includes multiple convolution layers. For given input, the convolution layers each extract image features from which a feature map is generated.

Referring to FIG. 3, the region-based convolutional neural network similarly generates one or more predictions for each input image, For example, the region-based convolutional neural network can generate predictions of the locations of bounding boxes in the image corresponding to particular classification types of a set of classification types. The region-based convolutional neural network includes a deep neural network backbone 304 (e.g., a convolutional neural network), a region proposal network 310, and a classification network 314.

An input image 302 is provided to the convolutional neural network backbone 304. The convolutional neural network backbone 304 includes a number of convolution layers 306. The convolution layers 306 extract image features to generate a feature map 308.

The feature map 308 is provided to the region proposal network 310. The region proposal network 310 generates regions of the image that are likely to contain objects of interest. These regions are combined with the feature map 308 to generate a combination of regions relative to the feature map 312. This is then input into the classification network 314. The classification network 314 attempts to classify the contents of each region as well as refine a bounding box dimension for each of the regions to generate one or more labeled bounding boxes 316 for the input image.

In some implementations, the input image is a document associated with a real estate transaction, e.g., a closing disclosure. The image is input to the region-based convolutional neural network 300. The output prediction can include a prediction of the location of bounding boxes surrounding particular pieces of information contained within the closing disclosure and a predicted classification of the content within each of those bounding boxes. In particular, each page can be input to a separate convolutional neural network model trained using examples of that page from a collection of closing disclosure documents.

Using a Neural Network to Identify and Classify Document Regions

Figure 4:
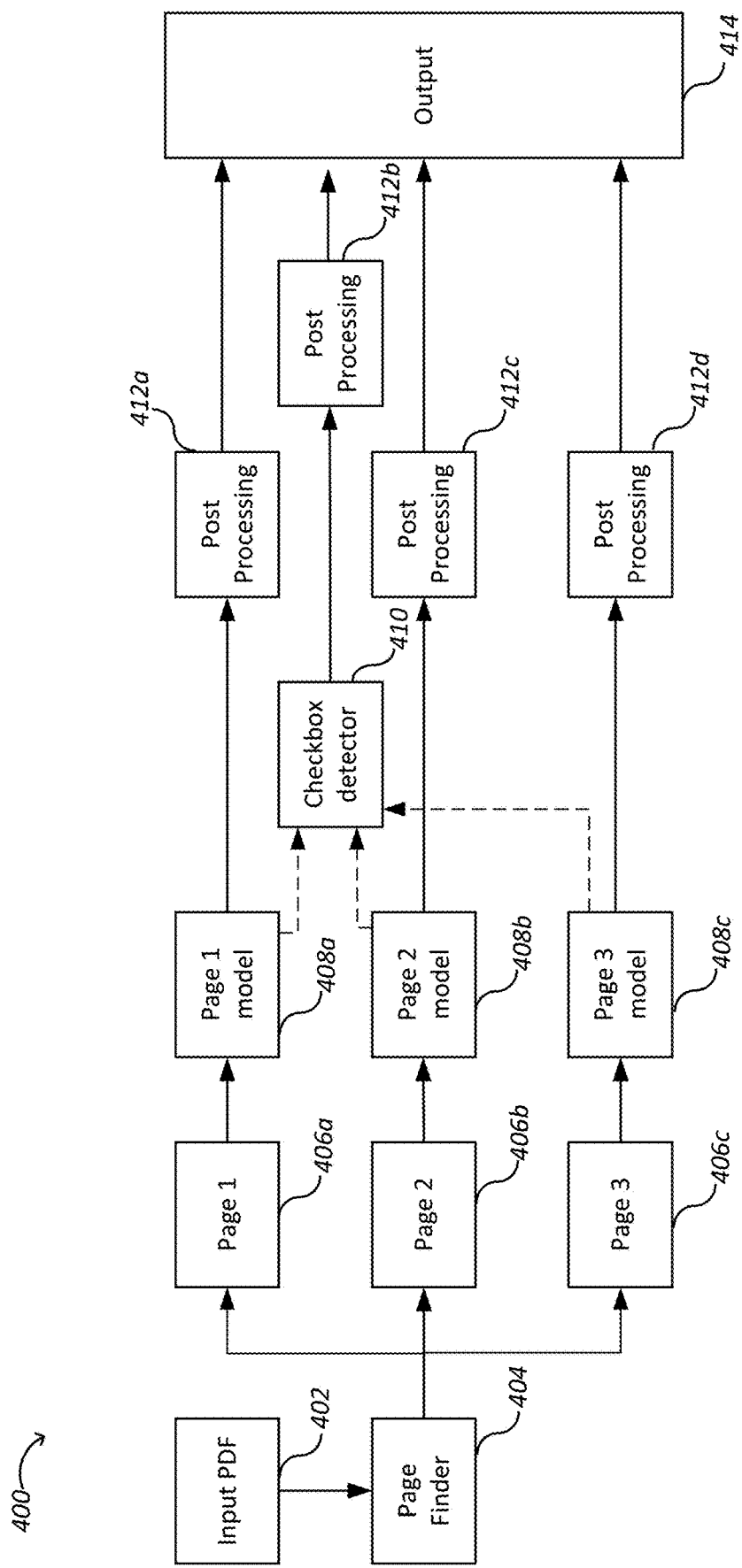
FIG. 4 is a diagram of an example document processing flow using a convolutional neural network to parse image content.

FIG. 4 is a diagram 400 of an example document processing flow using a convolutional neural network to parse image content. For convenience, the diagram 400 will be described in the context of a system that receives input images and outputs a data structure composed of particular extracted text sequences from the input images corresponding to labeled locations within the image.

The system receives an input file 402 composed of multiple images. For example, the input file can be a PDF document including many images representing different pages of the document. The PDF document may include more pages than are necessary to process using neural network models (e.g., computer vision models). For example, the PDF document may be part of a closing package that includes a large number of pages collecting many different documents into one file. The portion of interest within this large set may be only one document, e.g., the closing disclosure.

The system uses a page finder 404 to identify a first page of the portion of interest in the input file. The various documents that make up the input file may not be in the same order or always have the same number of pages. Therefore, the page finder cannot simply search for a particular page number. Instead, the page finder can search for a particular text string within the file that is indicative of the particular document. The text can be selected as unlikely to occur in other documents of the input file. For example, in the case of a closing disclosure, the string could be "transaction information" which occurs on the first page of a closing disclosure. In some implementations, the string is unique to the documents of the input file so that the first page can be uniquely identified. In some other implementations, candidate first pages are identified and further processing is performed on those candidates, for example, by searching for a secondary string or structural elements of the document.

Once the page finder identifies the starting page for the portion of interest, one or more pages can be extracted from the input file based on the number of pages corresponding to the portion of interest. Particular forms can have a defined number of pages. For example, a closing disclosure may be three pages in length. Consequently, once the first page is identified, it and the following two pages of the input file can be extracted for processing.

The pages of interest are separated into individual pages 406a, 406b, and 406c. Neural network models 408a, 408b, 408c are applied to respective pages. For example, each neural network model can be a computer vision model based on a region-based convolutional neural network. Each computer vision model can be trained for the particular page or page type. Thus, the content of a form having multiple pages can be different on each page. Training page specific models improves accuracy in recognizing objects with each page.

In some implementations, the form may have variations. For example, a third page of a closing disclosure may vary depending on whether the closing disclosure is related to a refinance of real property or a resale of real property. The system can be trained to recognize which type of closing disclosures, e.g., based on the content or layout of the third page, and apply the appropriate computer vision model. The determination can be made by post-processing the results of the machine learning model, whereby the system then chooses to include only the appropriate model results for further processing.

The objective of each computer vision model is to generate labeled bounding boxes corresponding to particular portions of the corresponding page. FIG. 6 shows an example page 600 of a closing disclosure with labeled bounding boxes. FIG. 6 shows a number of bounding boxes overlaid on the page to demonstrate what regions can be identified by the computer vision model. Each box includes a label indicating the type of information within the bounding box. Additionally, the bounding boxes can be nested within another bounding box. For example, in FIG. 6, there is a bounding box 602 labeled as "loan terms" that encompasses the loan amount, interest rate, monthly payment, prepayment penalty, and balloon payment lines. Within the bounding box 602 there are additional bounding boxes, for example, "loan amount" and "prepay penalty" bounding boxes 604 and 606. Each bounding box is defined by a set of coordinates defining the vertices of the bounding box defined relative to the image as a whole.

Referring back to FIG. 4, in addition to processing by the computer vision models 408a-c, pages can optionally be further processed by a checkbox detector 410. Whether or not the checkbox detector 410 is applied may depend on structure knowledge of the particular page as having or not having checkboxes, e.g., from known examples of closing disclosure documents. The checkbox detector 410 seeks to identify and label checkboxes within the page (e.g., labeled as checked or not checked). This information can be combined with text information relative to the checkbox to determine the corresponding text-checkbox combination.

For example, as shown in FIG. 6, there is a section of checkboxes with text to the right of each checkbox. In this example, the checkboxes represent whether the estimated monthly payment includes monthly portions of property taxes, homeowner's insurance, or other fees such as HOA dues. Additionally, as shown in FIG. 6, the computer vision model identified a bounding box 608 around all of the boxes and corresponding text, but not the content of each individual checkbox. When combined with information from the checkbox detector it is possible to determine both the status of the checkbox and the corresponding text in the labeled bounding box based on the relative positions of the checkbox with the text.

The checkbox detector 410 evaluates non-text content from an input page. The bounding boxes identified by the computer vision model may include non-text content. For example, bounding box 608 referenced above includes three checkboxes. While sometimes it may be possible to recognize an "x" checking a box as a character in the encoded text, the text string will typically not indicate which label the "x" belongs to, and may not consistently be encoded in such a manner.

In some implementations, the content of the checkbox bounding box can be separately processed by another image classifier that can recognize which box is checked, such as a second convolutional neural network that is trained to take only the checkbox region in as input and determine which, if any, of the boxes are checked. For example, bounding box 608 may be extracted as an image which is fed to a second convolutional neural network that recognizes the checkboxes and their state as checked or not.

In some alternative implementations, the computer vision model can be trained to recognize which box is checked as part of the predicted classification of a given bounding box surrounding a checkbox and its associated text.

The results from each computer vision model and the checkbox detector are fed into corresponding post processors 412a, 412b, 412c, 412d. The post processing includes processing identified tables within the image. The document page can include a table with a number of rows and columns. The system needs to be able to label the text inside of each cell of each table. In particular, to do this the system identifies special intersections of the detected rows and columns. Based on the labels assigned to each row and column, a label can be assigned to each cell.

FIG. 7 is an example table 700 that can be part of a page of a closing disclosure. Based on the computer vision model, each column and row can be identified by a bounding box and labeled. One such example is shown in FIG. 7 with row 702 and column 704. Also shown in the intersection of the row and column at cell 706. Specifically, the row "total closing costs (J) and the column "Final" are shown highlighted with example bounding boxes. In this example, the labels assigned to those bounding boxes can match the text. The intersection is the cell containing the value −$5,757.57. A label can be assigned to the cell 706 as "total closing costs (J): Final" representing the intersection of the row and the column. Thus, each individual cell can be labeled and associated with the corresponding text within that cell. The individual cell coordinates can be determined based on the coordinates of the vertices of the row and column bounding boxes and extrapolating the coordinate values where those two bounding boxes intersect on the image. The bounding box for this intersection can then be cross-referenced with text encoding metadata of the document or OCR results to find the text string contained in this location, in this case the text "−$5,757.57".

The system can perform another type of post processing related to error correction. Because the type of form is known, e.g., a closing disclosure, the system know what fields are expected to be detected for each page. If a field is missing, the system can try to reconstruct the bounding box and capture the information, if present. The system can use information about the location of the missing field relative to other detected fields to reconstruct the bounding box for the missing information. For example, on page 1 of a closing disclosure, the "borrower" is always directly above the "lender" but below the header 'Transaction Information'. Consequently, if the system successfully detected bounding boxes corresponding to the lender and the transaction information, but misses the borrower, the system can effectively reconstruct the missing bounding box for the borrower.

In some implementations, the post processing includes adjusting the detected bounding boxes based on the location and size of other detected bounding boxes. For example, the size of some bounding boxes can be truncated to prevent the bounding box from overlapping with another detected bounding box.

In some implementations, the system performs additional post processing to pages having more than one table. For example, a page can include two tables. Each table can have several lettered subsections with numbered row entries. All of the lettered subsections have dedicated labels to specifically detect the header row for that subsection. The letters occur in an alphabetically ordered list, e.g., [A, B, C, D, E, F, G, H, I, J]. If one is missing, the system determines where that row should be located with respect to the other detected rows. Specifically, the system takes advantage of the numbered rows to identify a subsection header because subsection should always precede a row starting with the number 1. In other words, subsection A is followed by rows labeled 1-m, subsection B is followed by rows labeled 1-n, etc.

In some implementations, the system performs error correction for mistakes in OCR of the documents based on the labels of detected regions. For example, the OCR often adds extraneous characters when it encounters checkboxes such as a single 'l' or 'w' or even messy unicode readout. The system includes post processing analysis that removes these extraneous characters when the system determines that a checkbox should be present at that location.

After post processing a final data structure 414 is generated. In particular, the system interprets the identified labels from the computer vision models and the associate text extracted from each bounding box. The labels from the computer vision models are mapped to known field names and the associated text is input as the values of these fields. That is, the data structure contains an association between field names and bounding box text. The specific bounding box information can then be discarded. Thus, during analysis, if text for a particular labeled type is needed, the text corresponding to the bounding boxes having the label can be identified from the data structure. This information can be placed in a data structure that can provide a more human readable format either directly or when interpreted by other portions of the system. For example, in some implementations, the data structure is a JSON file.

Figure 5:
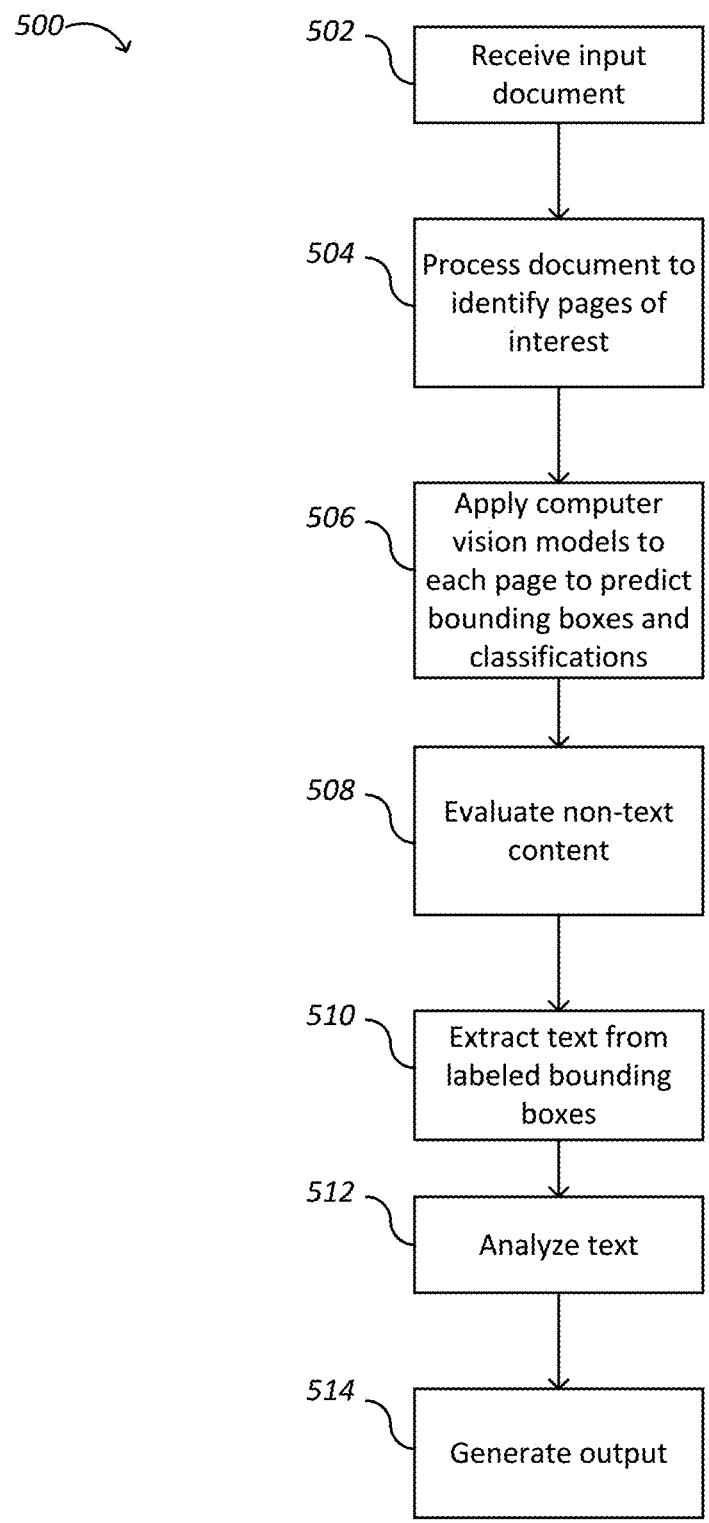
FIG. 5 is a flow diagram of an example process for extracting and analyzing content.

FIG. 5 is a flow diagram of an example process 500 for extracting and analyzing content. For convenience, the process 500 will be described as being performed by a system of one or more computers, located in one or more locations, and programmed appropriately in accordance with this specification. For example, the analysis system 100 of FIG. 1, appropriately programmed, can perform at least part of the process 500.

The system receives an input file (502). The input file can correspond to a collection of documents in a single file. For example, the input file can be a closing package having a number of different documents combined. One or more of these documents can include particular forms having a particular structure of receiving particular information. One example document is a multipage closing disclosure. In some implementations, the document is a Portable Document Format (PDF) file. The PDF file may be encoded with text information for the form or may only contain an image of the form.

The system processes the input file to identify particular pages of interest (504). For example, the file can be processed to identify a starting page of a document of interest and to extract that page and any additional pages of the document as described above with respect to FIG. 4. For example, the pages of interest can correspond to a closing disclosure found within a larger closing package. In some implementations, additional processing removes any text encoding information of the PDF and separates the pages so that there are a specified number of pages that just contain image information. The text encoding information can be retained for later use, e.g., during text extraction described below. Similarly, if the received document is in another form, such as a word processing file, the document can be converted into an image, e.g., as a PDF.

The system applies one or more computer vision models to each page image (506). The computer vision models, as described above with respect to FIGS. 2-4, predict the locations of bounding boxes in the image and labels them based on a predicted classification of the type or content of the bounding box. In the example of a page of a closing disclosure, the bounding boxes can correspond to particular information found in the form. The classification can describe the type of information described by the text in the bounding box. In some cases, the classifications may correspond to standard form text for the field or a shorthand label mapped to the type of field content. Whatever the case, the classifications allow for the unique identification of the different regions of text in the page.

The system evaluates non-text content in one or more page image (508). The bounding boxes identified by the model may include non-text content. For example, referring to FIG. 6, the bounding box 608 includes checkboxes. While it may be possible to recognize an "x" checking a box, the text string will typically not indicate which label the "x" belongs to.

In some implementations, the model can be trained to recognize which box is checked as part of the predicted classification. Thus, for example, bounding box 608 may be classified as "property taxes" because that checkbox is checked. As such, the content doesn't need to be separately extracted.

In some other implementations, the content of the checkbox bounding box can be separately processed by another image classifier that can recognize which box is checked, such as a second convolutional neural network that is trained to take only the checkbox region in as input and determine which, if any, of the boxes are checked. For example, bounding box 510 may be extracted as an image which is fed to a second convolutional neural network that determines that the check box corresponding to married is checked.

The system extracts text from the labeled bounding boxes (510). For example, when encoded text data is not available (e.g., from the original metadata of the input image), an optical character recognition technique can be used to recognize all text within the bounding boxes. The recognized text can then be extracted as a text string. In another example, the document originally included encoded text information. The system can pull just the encoded text information corresponding to the locations of the bounding boxes. As a result, the system has extracted text corresponding to each labeled bounding box. By using the computer vision models to identify particular bounding boxes it is easier for the system to ensure the text is associated with a particular type of content found in the document, for example, particular form data as well as the relationship with other content, e.g., relative location, presence near non-text content.

The system analyzes the extracted text content (512). The analysis can include post processing as described above with respect to FIG. 4. More broadly, the analysis can include using the extracted text to determine an operation or next step of the system. A data structure, as described above, can associate the encoded text of the document with particular labels of bounding boxes in which the encoded text occurs. Once particular text is parsed from the document, e.g., based on the type of label, the system can apply various appropriate natural language processing techniques or additional models to understand the meaning of the text and compare that to expected results. Values in the document can be compared to expected values for consistency. Names and other transaction variables can be verified for accuracy.

As one specific example, the extracted text can be provided to machine learning model used to understand what fee descriptions are in the particular closing disclosure document and match them to system descriptions, e.g., of a title production system. Since different providers can use different wording for the fee descriptions, simply recognizing the text may not be sufficient to determine the corresponding system description. Once mapped to the system description, the corresponding value for the fee, e.g., from an adjacent bounding box, can be compared to an expected value in the system to determine if it matches, and if not, if the next steps.

In some implementations, some degree of fuzzy matching can be allowed for determining whether the extracted content matches expected information. For example, the text may include a middle initial while the file data may include a full middle name. In another example, the manner in which title will be held may be abbreviated on the form, for example, "SP" for sole property. The system can define particular fuzzy matching rules and tolerances that allow for variation depending on the type of variation and a confidence that the variation is still a match.

The system provides one or more outputs (416). In some cases, the output is that the content matches and a title production workflow can proceed to a next step. In some other cases, the output is a flag for human interaction to resolve one or more discrepancies, for example, discrepancies in internal and/or external consistency. In yet other cases, the flag for human interaction is based on the type of entry into the form or an error in reading some or all of the information from the form.

The present specification describes unconventional steps to solve problems associated with identifying content from images files that are distinct from the conventional approaches. In particular, errors in fee collaboration can be greatly reduced from both manual evaluation and conventional OCR techniques taken alone. The content of particular document pages can be identified and evaluated with high confidence and accuracy automatically. Using a convolutional neural network, or a region-based convolutional neural network, trained to identify particular regions of specific page images improves the functions of the system by allowing for efficient evaluation of the content of the bounding boxes that is difficult with other techniques.

An electronic document, which for brevity will simply be referred to as a document, may, but need not, correspond to a file. A document may be stored in a portion of a file that holds other documents, in a single file dedicated to the document in question, or in multiple coordinated files.

In this specification, the term "database" will be used broadly to refer to any collection of data: the data does not need to be structured in any particular way, or structured at all, and it can be stored on storage devices in one or more locations.

Similarly, in this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

Control of the various systems described in this specification, or portions of them, can be implemented in a computer program product that includes instructions that are stored on one or more non-transitory machine-readable storage media, and that are executable on one or more processing devices. The systems described in this specification, or portions of them, can each be implemented as an apparatus, method, or electronic system that may include one or more processing devices and memory to store executable instructions to perform the operations described in this specification.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

In addition to the embodiments of the attached claims and the embodiments described above, the following embodiments are also innovative:

Embodiment 1 is a method, the method comprising: receiving one or more page images from a document; for each page image: providing the page image to a computer vision neural network model, wherein the neural network model is trained for the particular page type and is configured to output predictions of coordinates for one or more regions within the image and corresponding labels for the respective regions; and generating an output data structure associating each labeled region with text content located within the labeled region.

Embodiment 2 is the method of embodiment 1, wherein further comprising: analyzing the extracted text content using the corresponding labels to evaluate one or more of external consistency with other data records or internal consistency with content from one or more of the particular locations.

Embodiment 3 is the method of any one of embodiments 1 through 2, further comprising: determining non-text content within the image including: using an image classifier to identify checkboxes within the image and their corresponding state; and associating the identified location of one or more labeled regions in which the respective checkboxes are located.

Embodiment 4 is the method of any one of embodiments 1 through 3, comprising processing regions defining rows and columns of a table to determine text corresponding to individual table cells.

Embodiment 5 is the method of any one of embodiments 1 through 4, comprising performing error correction from the one or more regions including: determining that a region has failed to be identified; reconstructing the missing region using information about the location of the missing region relative to other detected regions.

Embodiment 6 is the method of any one of embodiments 1 through 5, further comprising adjusting the coordinates of one or more regions to prevent overlap.

Embodiment 7 is the method of any one of embodiments 1 through 6, wherein each computer vision neural network model is a region based convolutional neural network model and wherein the region-based convolutional neural network for a particular page type is trained based on a collection of labeled images defining coordinates of regions of interest in a collection of documents having the same page type along with labeled classifications for each region of interest.

Embodiment 8 is a computer storage media encoded with instructions that, when executed by one or more computers, cause the one or more computers to perform the method of any one of embodiments 1-7.

Embodiment 9 is a system comprising one or more computers and one or more storage devices storing instructions that are operable, when executed by the one or more computers, to cause the one or more computers to perform the method of any one of embodiments 1-7.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
receiving one or more page images from a document comprising a closing disclosure of a real estate transaction;
for each page image of the closing disclosure:
providing the page image to a corresponding computer vision neural network model of one or more computer vision network models, wherein each neural network model is trained for a particular page type and is configured to output predictions of coordinates for one or more regions within the image and corresponding labels for the respective regions; and
generating an output data structure associating each labeled region with text content located within the labeled region, the generating the output data structure comprising mapping the labels for the respective regions to known closing disclosure document field names and using the text from each region as corresponding field values.

2. The method of claim 1, further comprising: analyzing the text content located within the respective regions using the corresponding labels to evaluate one or more of external consistency with other data records or internal consistency with content from one or more of the particular locations.

3. The method of claim 1, further comprising:
determining non-text content within the image including:
using an image classifier to identify checkboxes within the image and their corresponding state; and
associating the identified location of one or more labeled regions in which the respective checkboxes are located.

4. The method of claim 1, comprising processing regions defining rows and columns of a table to determine text corresponding to individual table cells.

5. The method of claim 1, comprising performing error correction from the one or more regions including:
determining that an expected region has failed to be identified;
reconstructing the expected region using information about the location of the expected region relative to other detected regions.

6. The method of claim 1, further comprising adjusting the coordinates of one or more regions to prevent overlap.

7. The method of claim 1, wherein each computer vision neural network model is a region based convolutional neural network model and wherein the region-based convolutional neural network for a particular page type is trained based on a collection of labeled images defining coordinates of regions of interest in a collection of documents having the same page type along with labeled classifications for each region of interest, the region based convolutional neural network comprising a convolutional neural network backbone combined with a region proposal network that generates regions of the image that are likely to contain objects of interest.

8. A system comprising:
one or more computers and one or more storage devices storing instructions that are operable, when executed by the one or more computers, to cause the one or more computers to perform operations comprising:
receiving one or more page images from a document comprising a closing disclosure of a real estate transaction;

for each page image of the closing disclosure:
  providing the page image to a corresponding computer vision neural network model of one or more computer vision network models, wherein each neural network model is trained for a particular page type and is configured to output predictions of coordinates for one or more regions within the image and corresponding labels for the respective regions; and
  generating an output data structure associating each labeled region with text content located within the labeled region, the generating the output data structure comprising mapping the labels for the respective regions to known closing disclosure document field names and using the text from each region as corresponding field values.

9. The system of claim 8, further comprising: analyzing the text content located within the respective regions using the corresponding labels to evaluate one or more of external consistency with other data records or internal consistency with content from one or more of the particular locations.

10. The system of claim 8, further comprising:
determining non-text content within the image including:
  using an image classifier to identify checkboxes within the image and their corresponding state; and
  associating the identified location of one or more labeled regions in which the respective checkboxes are located.

11. The system of claim 8, comprising processing regions defining rows and columns of a table to determine text corresponding to individual table cells.

12. The system of claim 8, comprising performing error correction from the one or more regions including:
  determining that an expected region has failed to be identified;
  reconstructing the expected region using information about the location of the expected region relative to other detected regions.

13. The system of claim 8, further comprising adjusting the coordinates of one or more regions to prevent overlap.

14. The system of claim 8, wherein each computer vision neural network model is a region based convolutional neural network model and wherein the region-based convolutional neural network for a particular page type is trained based on a collection of labeled images defining coordinates of regions of interest in a collection of documents having the same page type along with labeled classifications for each region of interest, the region based convolutional neural network comprising a convolutional neural network backbone combined with a region proposal network that generates regions of the image that are likely to contain objects of interest.

15. One or more non-transitory computer-readable storage media encoded with instructions that, when executed by one or more computers, cause the one or more computers to perform operations comprising:
  receiving one or more page images from a document comprising a closing disclosure of a real estate transaction;
  for each page image of the closing disclosure:
    providing the page image to a corresponding computer vision neural network model of one or more computer vision network models, wherein each neural network model is trained for a particular page type and is configured to output predictions of coordinates for one or more regions within the image and corresponding labels for the respective regions; and
    generating an output data structure associating each labeled region with text content located within the labeled region, the generating the output data structure comprising mapping the labels for the respective regions to known closing disclosure document field names and using the text from each region as corresponding field values.

16. The non-transitory computer-readable storage media of claim 15, further comprising: analyzing the text content located within the respective regions using the corresponding labels to evaluate one or more of external consistency with other data records or internal consistency with content from one or more of the particular locations.

17. The non-transitory computer-readable storage media of claim 15, further comprising:
  determining non-text content within the image including:
    using an image classifier to identify checkboxes within the image and their corresponding state; and
    associating the identified location of one or more labeled regions in which the respective checkboxes are located.

18. The non-transitory computer-readable storage media of claim 15, comprising processing regions defining rows and columns of a table to determine text corresponding to individual table cells.

19. The non-transitory computer-readable storage media of claim 15, comprising performing error correction from the one or more regions including:
  determining that an expected region has failed to be identified;
  reconstructing the expected region using information about the location of the expected region relative to other detected regions.

20. The non-transitory computer-readable storage media of claim 15, further comprising adjusting the coordinates of one or more regions to prevent overlap.

21. The non-transitory computer-readable storage media of claim 15, wherein each computer vision neural network model is a region based convolutional neural network model and wherein the region-based convolutional neural network for a particular page type is trained based on a collection of labeled images defining coordinates of regions of interest in a collection of documents having the same page type along with labeled classifications for each region of interest, the region based convolutional neural network comprising a convolutional neural network backbone combined with a region proposal network that generates regions of the image that are likely to contain objects of interest.

* * * * *